UNITED STATES PATENT OFFICE.

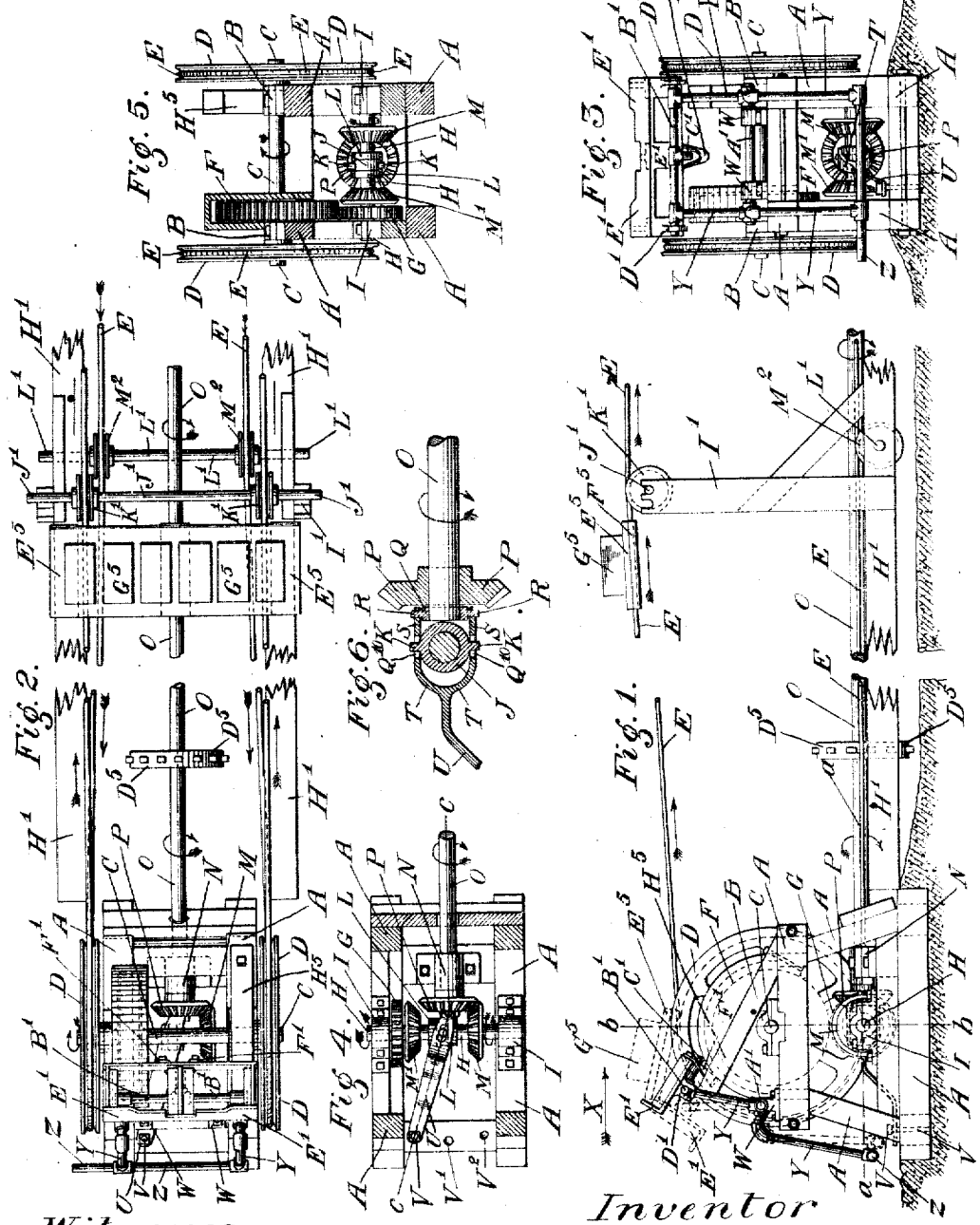

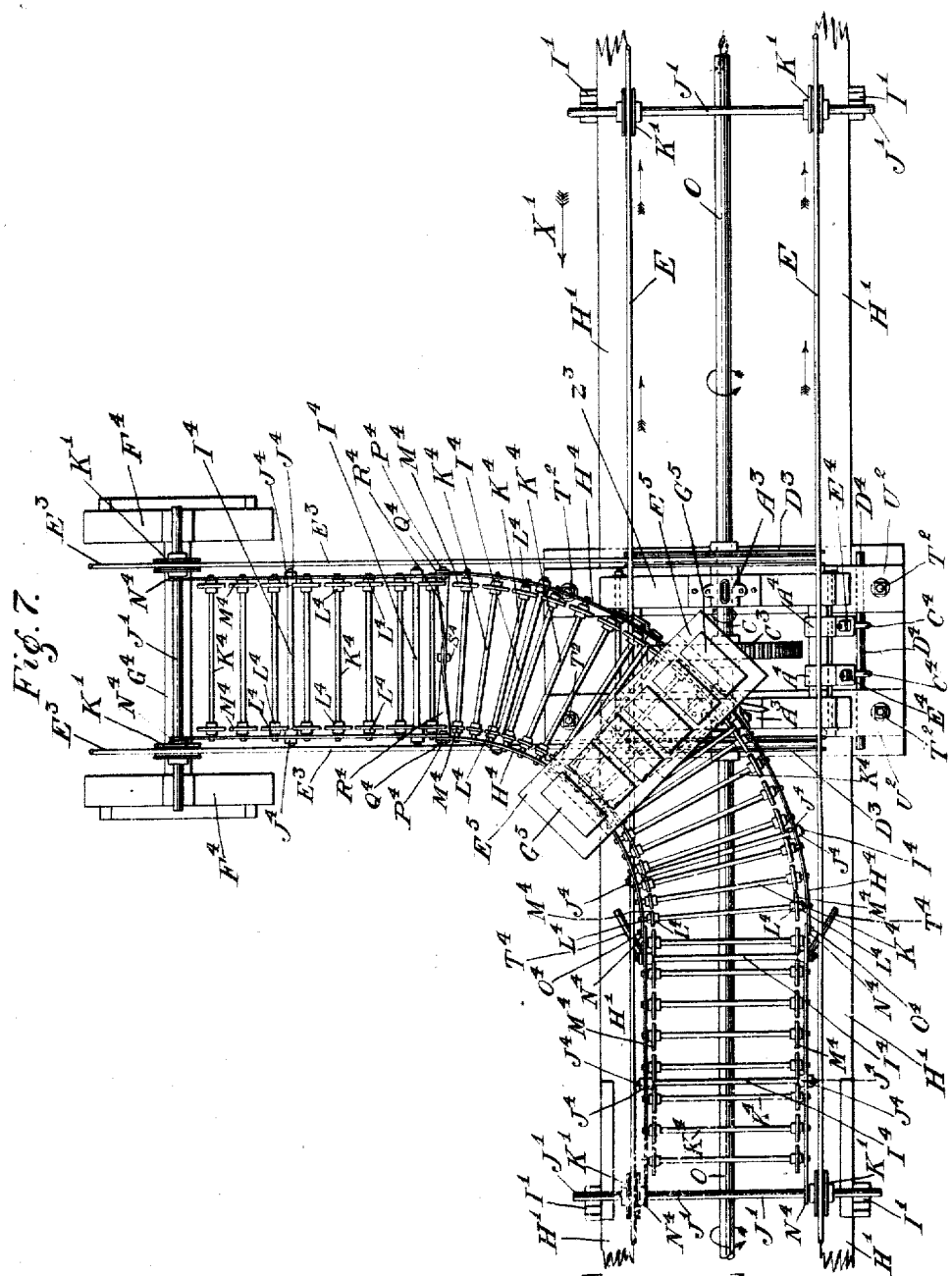

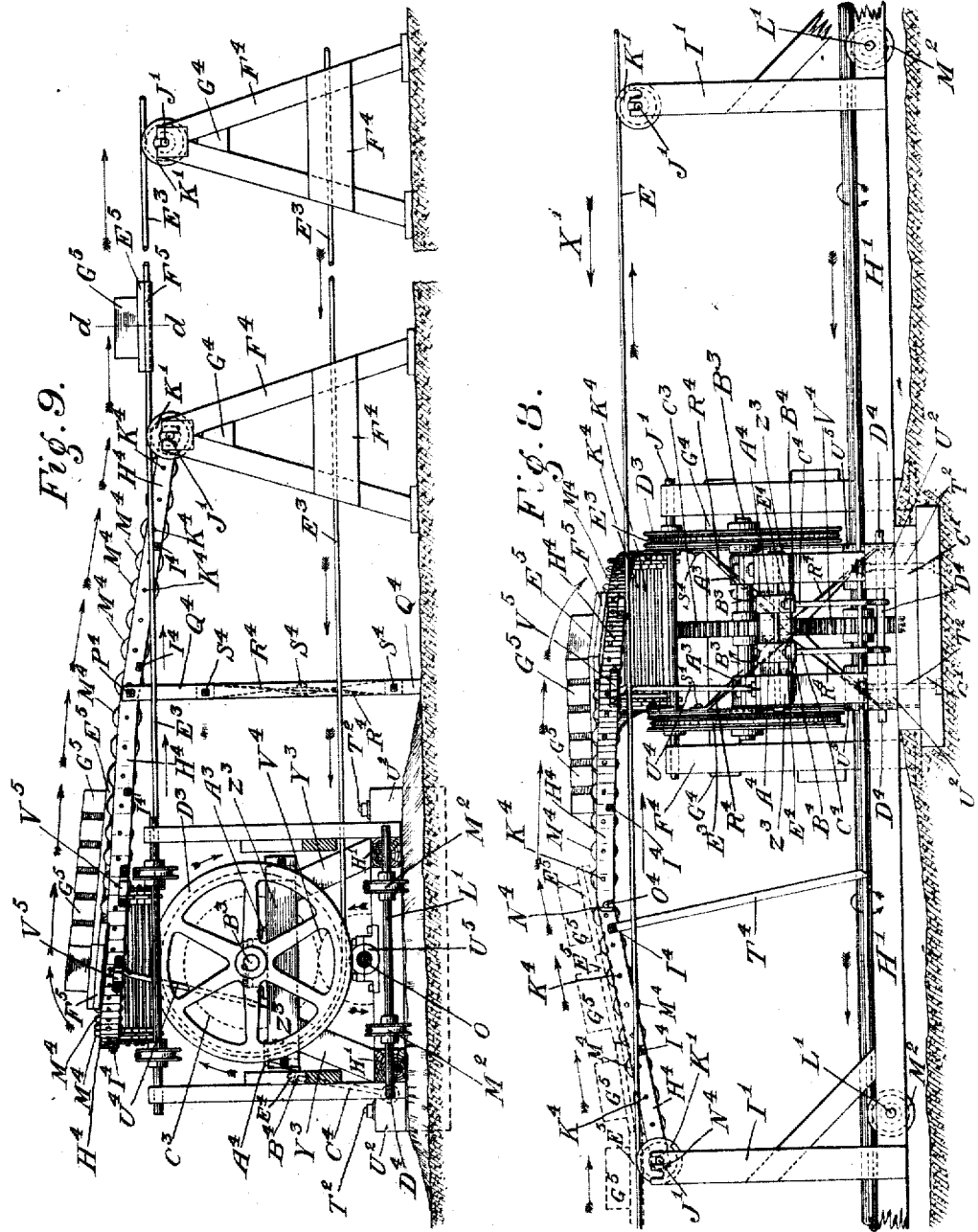

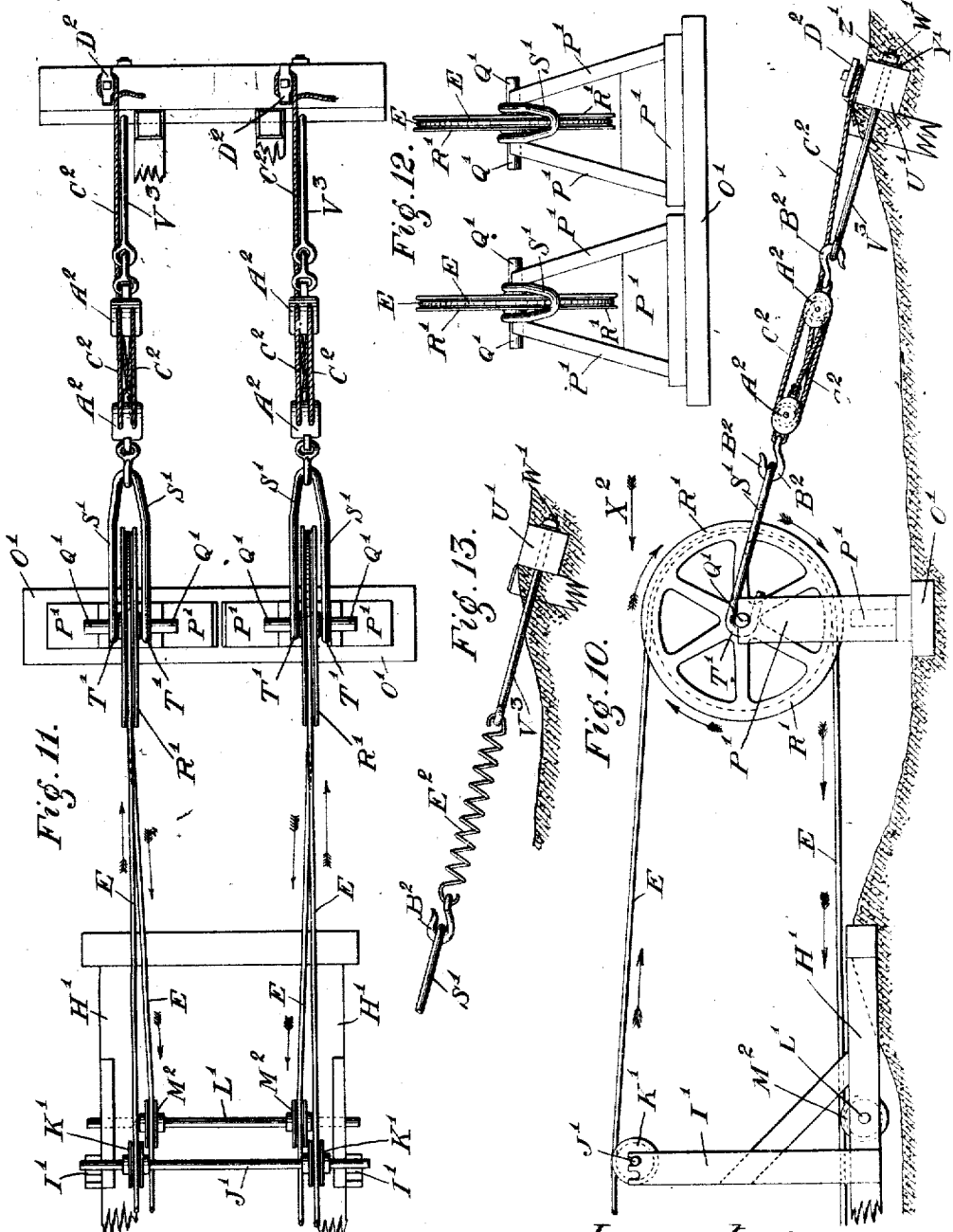

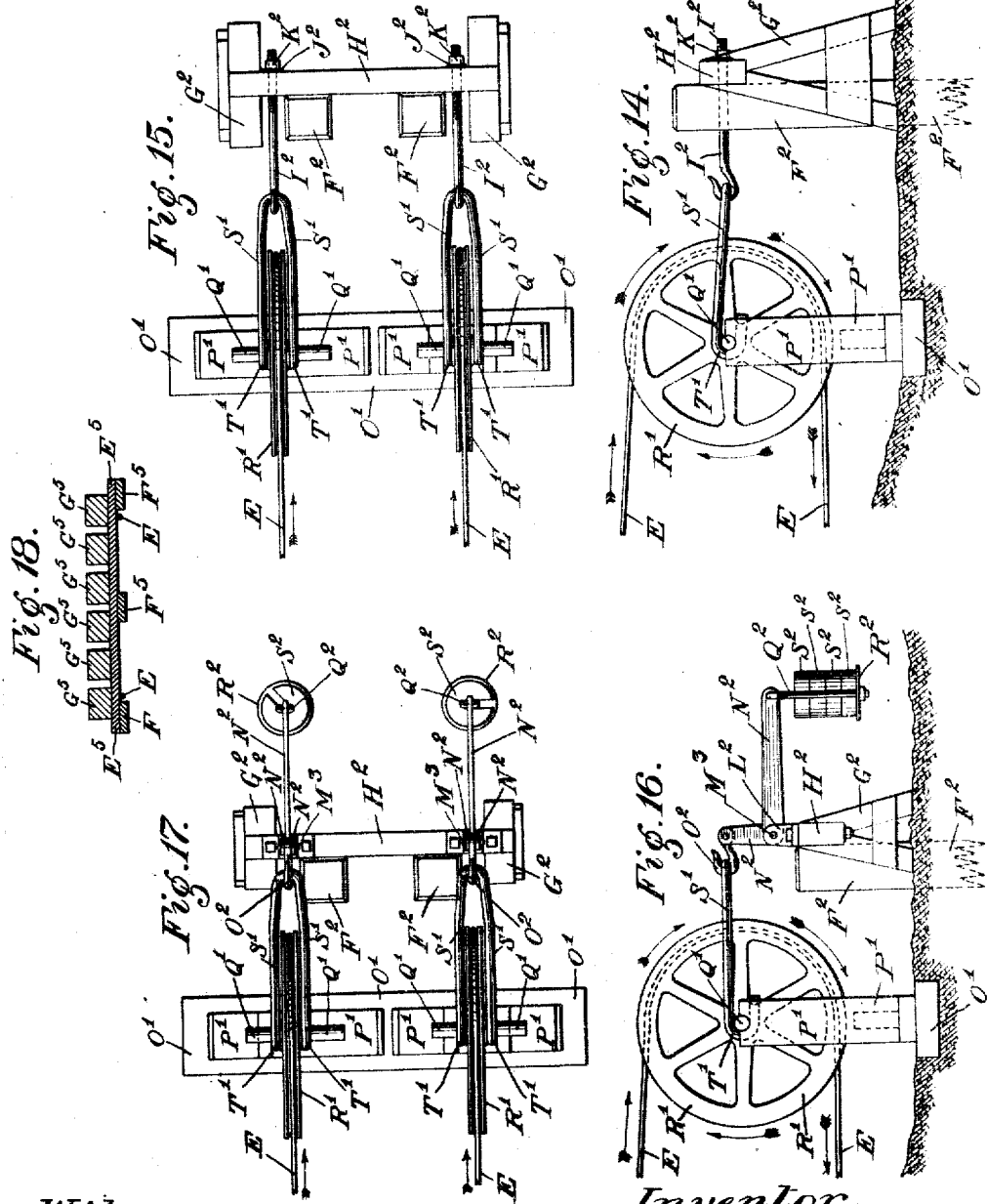

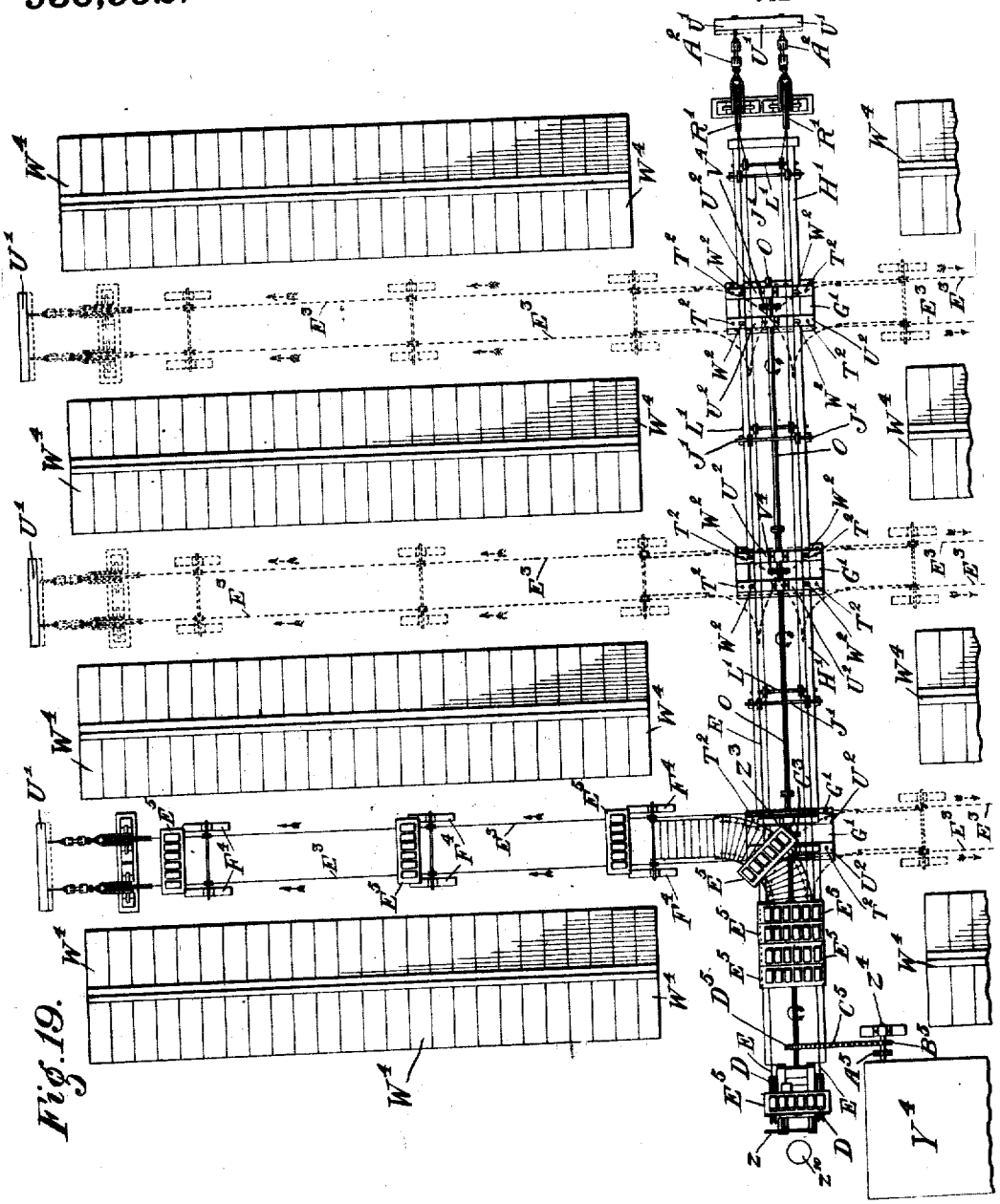

JOSEPH SIMONS, OF LOS ANGELES, CALIFORNIA.

CONVEYING AND DISTRIBUTING MECHANISM.

No. 930,992.   Specification of Letters Patent.   Patented Aug. 10, 1909.

Application filed May 11, 1908. Serial No. 432,694.

*To all whom it may concern:*

Be it known that I, JOSEPH SIMONS, of the city of Los Angeles, in the county of Los Angeles and State of California, have invented certain new and Improved Conveying and Distributing Mechanism, of which the following is a full, clear, and exact specification, reference being had to the annexed drawings and to the letters and figures marked thereon.

My said invention which consists of new and improved mechanism for conveying and distributing material, or articles of manufacture, is applicable for a numerous variety of purposes, and as hereinafter described and shown upon the drawings it is set forth and illustrated as particularly adapted for use in brick-yards, more especially for the purpose of conveying newly made bricks as they are delivered from the pressing or molding machine, and thence to the several drying sheds distributed throughout a brick-yard.

The mechanism constituting my said invention consists of a main line of transportation constructed mainly of a pair of somewhat slowly traveling wire cables, and of one or more conjunctively operating portable and transferable tracks of traveling cables, also made of steel wire.

The mechanism also includes means for carrying both the main line of traveling wire cables, and the conjunctively operating portable or transferable lines or tracks of cables.

My mechanism otherwise consists of the next described essential parts, namely: means for receiving the moist bricks as they issue from the molds of the press or pug-mill upon carrier boards or trays for being discharged upon the main line of the conveying cable mechanism from which at any required point or points on said main line of cable mechanism, the carrier boards or trays with the moist bricks thereon, are switched to the portable side tracks from which they are removed by hand into the drying sheds.

The said mechanism also includes means for retaining the main line of cables in the necessary state or condition of tension, a main line of shafting for operating the various portions of the mechanism and means for transferring in operative succession each of the boards or trays with moist bricks thereon, from the main line to the portable line between the rows of drying sheds and operating simultaneously and conjunctively as hereinafter described.

Upon the annexed drawings Figure 1 is a side elevation of the receiving end of the mechanism and part of the discharging mechanism of the main line of conveying cables, together with one of the intermediate roller supports for the said cables, showing in dotted lines one of the boards or trays with the bricks thereon in the position they occupy at the moment of starting to be moved by the conveying mechanism; showing also another board or tray in transit in full lines, and a portion of the main driving shaft. Fig. 2, is a plan corresponding with Fig. 1, but with the first brick carrier or tray omitted. Fig. 3, is a separate end elevation of the receiving and discharging mechanism viewed in the direction of the arrow X, in Fig. 1. Fig. 4, is a horizontal section taken on the line $a, a$, Fig. 1. Fig. 5, is a transverse view partly in section and partly in elevation, the section being on the line $b, b$, Fig. 1. Fig. 6, is a section taken on the line $c, c$, Fig. 4, through the reversing lever, the shifting sleeve, the loose collar to which the reversing lever is pivoted, the bevel driving gear and a portion of the driving shaft, and a portion of the reversing lever being broken away. Fig. 7, is a plan of the mechanism for operating the portable side track, and a curved roller track, both of which operating in conjunction, transfer the boards or trays and the bricks thereon from the main track to any one of the side tracks as hereinafter described. Fig. 8, is a side elevation corresponding with the plan shown at Fig. 7. Fig. 9, is an end elevation looking in the direction of the arrow X', Figs. 7, and 8. Fig. 10, is a side elevation of means for holding the conveying cables in tension. Fig. 11, is a plan corresponding to the side elevation Fig. 10. Fig. 12, is an end elevation of the tension sheaves or grooved wheels upon which the cables are carried with the frames wherein the sheaves rotate upon their axes. Fig. 13, is a side elevation of a modified arrangement of the means for producing tension of the cables. Fig. 14, is a side elevation of another modification of the means for producing tension of the cables. Fig. 15, is a plan corresponding to Fig. 14. Fig. 16, is a side elevation of another - modification of means for producing tension on cables. Fig.

17, is a plan corresponding to Fig. 16. Fig. 18, is a transverse section on the line d, d, Fig. 9, through one of the brick carriers, or trays, showing the bricks in section thereon, and in position upon the carrying cables also shown in section. Fig. 19, is a plan drawn upon a smaller scale, of a brick-yard or portions thereof, equipped with the apparatus constituting my invention, and showing the same as installed for operation.

The apparatus constituting my invention consists of a framework A, to the upper part of which are attached the bearings B, for the rotating shaft C. This shaft C, carries the sheaves or grooved wheels D, and D, respectively, and within the groove of each of these wheels the main line cables E, E, are carried.

Upon the shaft C, there is rigidly mounted the spur wheel F, and engaging with which is the pinion G, rigidly secured to a second shaft H, rotatably and slidably supported in bearings I, attached to the lower portion of the frame A. Upon this shaft H, and about centrally of its length, is a loose collar J, having diametrically projecting pins K. Upon either side of the collar J, and loosely in contact with the same are two other collars L, L, secured to the shaft H, by set screws, or otherwise rigidly secured thereto. Upon the shaft H, exterior to the collars L, and with their toothed portions turned toward the collar L, are also two bevel gear wheels M, and M'. In a bearing N, Fig. 1, which is fastened to the lower portion of the frame A, is the main driving shaft O, centrally situated beneath and between the sheaves D, D, which shaft O, is at right angles to the shaft H, and in the same horizontal plane therewith.

Upon the shaft O, and near the end thereof, there is rigidly fastened the driving bevel gear wheel P, Figs. 1, 2, 3, 4, and 5, which is capable of being shifted into gear with either of the bevel wheels M, or M'. At one end of the shaft O, as shown in the enlarged section of these parts at Fig. 6, beyond and adjacent to the driving bevel gear wheel P, is a loose collar Q, having projecting pins R, R. Upon these pins R, R, are pivoted the ends S, S, of the U-shaped portion T, of a reversing lever U, whose opposite end is provided with a hole for a drop bolt V, as shown at Figs. 2, and 4, for the purpose of locking the reversing lever U, in either of three positions; namely, the position shown in Fig. 4, wherein the bevel wheel M is in engagement with the bevel pinion P; the position in the hole V', in the frame A, wherein the bevel wheels M, and M', are both out of engagement with the bevel pinion P; and the position in the hole V², in the frame A, wherein the bevel pinion M', comes into engagement with the driving bevel wheel P. The ends S, as shown in the enlarged view Fig. 6, of the reversing lever U, have holes Q'", slotted in them for the pins K, of the loose collar J, to pass into. The reversing mechanism consisting of the bevel pinions M, M', and P, and the sliding shaft H, is for the purpose of enabling the shaft C, and the sheaves to be revolved in a constant direction, while the driving shaft O, is being rotated in either direction.

Carried in bearings W, at the end of the upper portion of the frame A, is a rocking frame Y, which may be constructed of gas pipe as shown at Figs. 1, 2, and 3, more especially, consisting of the side portions Y, the lower cross bar Z, the central cross bar or shaft A', and an upper cross bar B', having a projecting stop C' rigidly secured to said cross-bar B'. Upon the cross bar B', there is carried pivotally by the lugs D', a receiving frame E', of cast iron or other suitable material, there being some freedom of movement between the frame E', and the stop C', and depending from said receiving frame E' also secured thereto by rivets or otherwise, is a U-shaped strap F', more particularly shown at Figs. 2, and 3, adapted to engage the stop C', upon the cross bar B' when said receiving frame E', is rotated rearwardly into the position indicated by dotted lines in Fig. 1.

Parallel to, and upon either side of the driving shaft O, and supported at intervals upon brickwork, or other solid foundation G', Figs. 6, 7, 8, 9, and 19, are timbers H', and to these timbers H', there are attached at intervals by bolting or nailing, the uprights I', braced as shown, and which are grooved at the top to receive stationary shafts J⁴, upon which the idler grooved sheaves K', revolve. In the grooves of these sheaves K', the upper portion of the cables E, are supported. The lower timbers H', have transverse holes at intervals in them to receive the stationary shafts L⁴, which carry the grooved idlers M², and support the lower portions of the cables E.

At the end of the main line of cables E, farthest from the receiving end of the mechanism, is a tension device shown more particularly in Figs. 10, 11, and 12, wherein is a foundation or mud-sill O', upon which the rocking or sliding frames P'', rest. These frames P'', are constructed as shown, and are grooved transversely at the tops thereof to receive the stationary shafts Q', for the main cable carrying sheaves R', which when in operation rotate loosely on the stationary shafts Q'. Passing around each of the grooved sheaves R', is a U-shaped tension bar S', the upper ends of which consist of hooks T', for engaging the shafts Q', upon either side of each of the said sheaves R'.

At a suitable distance beyond the frames P'', is a sill U', by preference partly or wholly buried in the ground, and passing therethrough are the eye-bolts V³, having screw-threaded ends W', each passing through a washer Y', and secured by a nut Z'. The particular means used between the eye-bolts V³, and the loop bars S', for obtaining the necessary tension in the cables E, is shown in Figs. 10, and 11, as consisting of pulley blocks A², attached to the tension bars S', and the eye-bolts V³, by means of hooks B², B², and the rope C². The free ends of the rope C², are fastened to the cleat D², or to any adjacent immovable object, and the tension is varied by operating this block and tackle device by loosening the loop from the cleat D², and by letting out, or drawing in the rope C², as is well understood, and which therefore need not be herein further referred to.

Various kinds of tension devices as modifications of that hereinbefore described, may be used instead of the block and tackle device, and attachments, hereinbefore described. For example, instead of the blocks A², and ropes C², springs E², may be used as shown in Fig. 13. Another arrangement for producing the necessary tension is shown at Figs. 14, and 15, in which case I use piles F², F², driven into the ground to a depth sufficient to secure the requisite rigidity, and the trestle G², the upper members H², of which are placed in contact with the piles F², constitute a rigid support for the hook bolts I², I², engaging with the tension loops S', at one end, the opposite ends of which are screw-threaded, and pass through the upper members H², of the trestle G², and are secured and tightened therein by screw nuts K², by screwing up which any required degree of tension may be imparted to the cables E. Still another arrangement of tension device is that shown at Figs. 16, and 17, wherein the trestles G², corresponding with a trestle shown at Figs. 14, and 15, are in this case illustrated as being provided with bearings L², secured thereto by bolts as shown, and to which are attached by the pivots M³, the bell-crank levers N², to the shorter arms of which are pivotally connected the hooks O², O², engaging the tension bars S', S', and to the larger arms of which the eye-bolts Q², provided with supporters R², and projections S², are attached for producing the necessary degree of tension for stretching the cables E, E.

At a distance apart upon each of the foundations G', Figs. 7, 8, 9, and 19, and attached thereto by the anchor bolts T², are the cross timbers U², to which are bolted bearings U³, for the shaft O, and midway between each such pair of cross timbers U², U², and rigidly secured to the driving shaft O, is a spur pinion V⁴. The timbers U², are provided with shallow mortises W², Fig. 19, into which tenons, not shown in the drawings, at the base of the members Y³, Y³, of a framework Z³, Z³, enter. On a shaft B³, arranged directly above and parallel to the driving shaft O, and carried in the bearings A³, is a spur wheel C³, which engages below with the spur pinion V⁴, as shown.

To the ends of the shaft B³, and exterior to the bearings A³, thereof, as shown more especially at Figs. 8, and 9, are the large grooved sheaves D³, around and upon which the wire ropes E³, E³, constituting the side tracks of my conveying and distributing mechanism are carried.

For the purpose of securing the frame Z³, to the cross timbers U², in a readily detachable manner, metal straps A⁴, are provided and adapted to hook over the upper cross members of the frame Z³. These metal straps A⁴, have outwardly bent ends B⁴, having holes therein through which are adapted to pass the upper screw threaded ends of the clamping eye-bolts C⁴, C⁴. Passing through the eyes of the eye-bolts C⁴, C⁴, and through all the timbers U², U², is a rod or bar D⁴, which serves to anchor the frame Z³, to the foundation timbers U², when the nuts E⁴, at the upper threaded ends of the eye-bolts C⁴, are screwed down.

The shafts J', carrying the idlers K', for supporting the upper cables E, of the side track instead of being supported upon stationary uprights as in the case of the main line cables, are supported in grooves at the top of the trestles F⁴, having cross members G⁴, for stiffening the same.

The lower parts of the side track cables E³, when not of considerable length do not require to be supported from below as in the case of the cables constituting the main track, but they are provided at the end farthest from the main line, with a tension apparatus, corresponding to either of the modifications of such tension apparatus hereinbefore described with reference to the main line cables.

For the purpose of transferring the carriers or trays with the bricks thereon, from the main line cables E, to the side track cables E³, there is provided a roller track consisting of a central portion curved in an arc of preferably about ninety degrees, and a straight portion at either end of, and pivotally attached to the curved portion. The said curved track consists of flat side-bars of metal H⁴, held at the proper distance apart by spreaders consisting of round stationary bars of metal I⁴, secured to the side bars H⁴, by nuts J⁴, in the manner shown. At intervals, preferably regular intervals between the curved side bars H⁴, are radially disposed rotatable axles K⁴, journaled at their ends so as to be carried rotatably in hole bearings near the upper edges of said side bars H⁴, as shown at Figs. 7, 8, and 9, and on a reduced scale in the general plan Fig. 19. For a short distance within and adjacent to their journals, the axles K⁴, are screw threaded and provided with two nuts L⁴, at either end of said axles, as shown at Fig. 7. Between each pair of such nuts L⁴, is clamped a disk or roller M⁴, of hard rubber or analogous material. The rollers M⁴, adjacent to the shorter or inner curved portion of the track are of smaller diameter than those adjacent to the outer curved portion of the track; their proportionate diameters being such that they correspond to the diameter of opposite ends of truncated cones whose apices are situated at the center of the concentric circles of which the outer and inner curves of the track are arcs. The remaining parts of the roller portions of the track are constructed in a manner precisely similar to the curved portion now last herein described, excepting that the side bars H⁴, are straight and the rollers M⁴, at opposite ends of the axles K⁴, are both of the same diameter, preferably corresponding in size to the larger of the rollers upon the curved portion of the track. The outer ends of the various side bars are formed into hooks N⁴, and the outer hooked ends are supported upon the stationary axles J′, of the cable carrying idlers K′. The hooked ends N⁴, of the curved side bars H⁴, are supported upon studs O⁴, upon the straight side bars, or are fastened by bolts P⁴, which also connect a supporting frame of metal, consisting of uprights Q⁴, and diagonal braces R⁴, connected thereto and to one another, by bolts or rivets S⁴. Additional supports or props T⁴, are provided, and are clamped by the nuts J⁴, upon the ends of the spreaders I⁴. Other intermediate props U⁴, pointed at their lower ends and adapted to rest upon the frame Z³, give additional support to the curved track and are adapted to fit into sockets V⁵, bolted or riveted to the curved side bars H⁴, as shown.

In Fig. 19, are shown the various drying sheds W⁴, arranged in rows parallel to one another equidistant from the driving shaft O, transversely thereto, and upon either side thereof.

To the right of the pug-mill or brick-press Y⁴, as shown at Fig. 19, is a counter-shaft Z⁴, provided with a sprocket wheel A⁵, whereby the shaft Z⁴, may be rotated in either direction by means of a chain connected with any proximate and convenient driving shaft, the latter not being shown in the drawing. Upon the countershaft Z⁴, is rigidly mounted another sprocket wheel B⁵, around which, and around another sprocket wheel D⁵, upon the line shaft O, passes an endless sprocket chain C⁵, whereby the said line shaft O, may be driven in either direction of rotation as the countershaft Z⁴, is rotated in one direction or the other.

The bricks are received from the pug-mill, or brick machine Y⁴, upon wooden carriers consisting of boards E⁵, upon the under sides of which are nailed transverse battens F⁵, as shown with the bricks G⁵, thereon in Fig. 18.

In operating the device in the position shown in full lines in Fig. 19, the reversing lever U, is placed in the position wherein the end thereof is held by the drop bolt V, in the hole V², in the frames A, which is the reverse position to that shown in Figs. 1, to 6, inclusive.

The operation of the apparatus or mechanism constituting my said invention, is as follows: The attendant standing in the position marked with the circle Z¹⁰, in Fig. 19, receives the boards or trays with the fresh molded bricks thereon as these are delivered in succession from the pug-mill, or press, or brick machine Y⁴, and upon thus receiving a carrier with the bricks thereon the attendant places his foot upon the lower crossbar Z, Figs. 1, 2, 3, and 19, of the frame Y, pressing it sharply toward the frame A, which it strikes. The sudden stoppage of the frame Y, causes the receiving frame E′, Figs. 1, 2, and 3, to turn backward upon the crossbar B′, into the position shown in dotted lines at the upper lefthand part of Fig. 1, its turning movement being limited by the strap F′, which catches upon the stop C′, attached to the upper crossbar B′. In this position one of the carriers E⁵, with the bricks G⁵, thereon is placed by the operator upon the receiving frame E′. The operator then removes his foot from the lower crossbar Z, and the frame Y, the upper part of which is slightly inclined toward the wheels D, falls against a stop H⁵, attached to the frame A, when the shock caused by this impact produces momentum of the receiving frame E′, and causes it to again tilt, but in the opposite direction, upon the crossbar B′, into the position shown in full lines in Figs. 1, 2, 3, and 19, and to discharge the brick carrier E⁵, with its load of fresh molded bricks upon the rims of the wheels D, which by their rotation immediately transfer said carrier E⁵, upon the main line conveyer cables E. The operator then again depresses the crossbar Z, and places another loaded carrier E⁵, upon the receiving frame E′, and this operation is rapidly continued in succession at short intervals of time. The direction of rotation of the various shafts and the direction of travel of the various cables, is indicated in all the figures by arrows placed adjacent thereto in the drawings. The passage of the loaded carrier E⁵, upon the main line cables E, carries them to the roller track upon the inclined portion of which, shown at the lefthand upper portion of Fig. 8, they are forced to mount one at a time by the impact and pressure of the carriers in their rear as shown by the dotted lines in Fig. 8. When the front one of the carriers E⁵, has reached the point of highest elevation which is just beyond the supporting prop T⁴, as shown in Fig. 8, and being still pressed forward, it is discharged over this highest elevation and rolls by gravity upon the downwardly inclined curved path composed of the rollers M⁴, mounted rotatably in the bearing bars H⁴, thence upon the subsequent rollers L⁴, L⁴, of the straight portion of the roller track, from which each board or. tray E⁵, in succession, with its moist or green bricks G⁵, is finally discharged upon the side track cables E³. The board or carrier E⁵, immediately behind any one of such carriers which has discharged upon the downward inclined, curved path does not follow the immediately preceding carrier until another carrier, E⁵, with the charge of bricks G⁵, from the pug-mill end of the main line cables E, makes impact with and presses at the rear of all the other carriers upon the upward incline of the roller R⁴, carried in bearings in the bars H⁴, and constituting this part of the roller track. The distance apart of the various carriers E⁵, is therefore always regulated by the lengths of intervals of time which separates the discharge of consecutive carriers from the receiving frame E', and which are more or less regular and dependent upon the skill of the operator, in the position Z¹⁰, Fig. 19.

The boards or carriers E⁵, with their charge of moist or green bricks G⁵, as they pass toward the ends of the side track cables E³, farthest from the main line cables E, are removed therefrom by another attendant or operator who places them in the drying sheds W⁴, Fig. 19, first at the ends most distant from the said main line, and who gradually moves nearer to said main line removing the boards or carriers and moist or green bricks as the drying sheds become gradually filled, therewith. When the drying sheds W⁴, upon either side of a side track E³, are thus filled, the side track tension apparatus is removed, the roller track removed, the nuts upon the clamping eye-bolts C⁴, may be unscrewed, the anchor-bar D⁴, is withdrawn from the timbers U², and the entire side track apparatus may be conveyed to and attached in any one of the several positions upon the same side of the main line indicated in dotted lines in Fig. 19. When all of the drying sheds W⁴, upon one side of the main track E, E, have been filled, then the side track apparatus is, or may be transferred to one of the operative positions indicated in dotted lines at the opposite side of the main track E, E, Fig. 19. The direction of rotation of the countershaft Z⁴, Fig. 19, is then reversed, and the position of the reversing lever U, is changed to that wherein the drop bolt V, in the end thereof falls into the hole V, in the frame A, as in Figs. 1, to 6, inclusive. By this means the shaft H, is slid endwise in its bearings I, so as to bring the bevel pinion M, into engagement with the driving bevel wheel P. The rotation of the shaft C, then takes place in the same direction as before, although the line shaft O, now rotates in the direction opposite to that of the direction hereinbefore described, as indicated by arrows in Figs. 1, to 6, inclusive, and which shows a direction of rotation opposite to that in the other figures which illustrate the direction of rotation when the side track is being operated upon the opposite side of the main line.

While I have described, and illustrated the apparatus constituting my invention as applied to a brickyard for the purpose of conveying bricks from a brick making machine, and thereafter distributing them through a curved track of rollers, and thence to a second cable track placed at right angles to the main line of conveying cables leading to the desired portions of the brickyard; it is evident that the side tracks may be operated through a wide range angularly to the main line, in such cases the curved frame or bars carrying the rollers being curved to connect the angularly situated side tracks with the main track.

My apparatus in the form described, or in a modified form, may with facility be applied for the conveyance and distribution of other materials in other places, and under various other conditions.

I claim as my invention.

1. In conveying and distributing mechanism, wherein conveyance is effected by traveling cables, a receiving device consisting of a rocking frame, bearings for the rocking frame carried on supports, a projecting stop at the upper part of the rocking frame, a receiving table pivotally mounted upon said upper part of the rocking frame, a strap inclosing said stop; and the conveying cables for operating in proximity to, and in conjunction with the receiving device.

2. In conveying and distributing mechanism, wherein conveyance is effected by traveling cables, a frame provided with bearings at the upper part thereof, a shaft rotating in said bearings, peripherally grooved wheels rigidly attached to said shaft, a spur wheel upon said shaft, a second shaft beneath and parallel to said shaft, said second shaft slidably mounted in bearings in the lower part of the frame, a spur pinion upon said second shaft, near one of the ends thereof; a loose collar at the center of said second shaft, and having diametrically opposite projecting pins, two collars upon said second shaft, one on each side of said loose collar, bevel pinions rigidly secured to said second shaft, and facing toward the loose collars, a third shaft disposed at right angles to, and in proximity to said second shaft; another bevel pinion rigidly secured to said third shaft near one end thereof, a loose collar upon the end of said third shaft having diametrically opposite projecting pins; a reversing lever having a bifurcated end pivoted upon said pins, said reversing lever being slotted to receive the projecting pins of the loose collar upon the second shaft; means for locking said reversing lever in any one of three different positions; conveying cables operated upon the peripherally grooved wheels; and means for driving the aforesaid third shaft, all substantially as, and for the purposes specified.

3. A conveying mechanism consisting of a receiving table, a rocking frame therefor, bearings for said rocking frame supported upon a framework, said framework having bearings secured thereto for a driven shaft, peripherally grooved wheels upon said driven shaft, a spur gear wheel upon said shaft, a second shaft beneath the aforesaid shaft, and slidable in bearings in the framework, a pinion on the second shaft meshing with the said spur gear, a spur pinion on said second shaft gearing with said spur wheel on said driven shaft, bevel pinions upon said second shaft, a loose collar upon said second shaft provided with projecting pivots, a third shaft at right angles to said second shaft, and provided with a bevel pinion capable of engaging either of the bevel pinions on the second shaft, a loose collar on said third shaft provided with projecting pivots, tight collars on the second shaft one on either side of said loose collar, a reversing lever operating upon the several pivots; means for locking said reversing lever, another frame extending longitudinally from the aforesaid frame and provided at intervals with intermediate supports for the conveying cables, said intermediate supports carrying stationary shafts and rotatable grooved sheaves for the endless conveying cables, means for maintaining the conveying cables in the condition of necessary tension.

4. In conveying and distributing mechanism, the combination with a driving shaft rotatably supported in bearings attached to a stationary foundation, of a pinion secured to said driving shaft, a detachable frame, clamps for attaching said frame to said foundation; a second shaft above and parallel to said driving shaft, and rotatably supported in bearings in said frame; a spur gear wheel upon said second shaft, and engaging with the pinion upon the driving shaft; wheels secured to said second shaft and having peripheral grooves, and conveying cables operating within said peripheral grooves.

5. In conveying and distributing mechanism, the combination with a driving shaft rotatably supported in bearings attached to a series of stationary foundations, of a series of pinions secured to said shaft, one at each of said foundations; a main line of conveying cables parallel to said shaft, a second or side track line of conveying cables at an angle to the main line, peripherally grooved sheaves for carrying and driving said side track cables, a driven shaft to which said grooved sheaves are secured, a spur wheel upon said driven shaft, bearings for said driven shaft attached to a frame, said frame being attachable to any one of the series of foundations, and in a position whereat the spur wheel upon the driven shaft engages with, and is driven by the corresponding spur pinions upon the driving shaft, and removable clamps for securing said frame to said foundation.

6. In conveying and distributing mechanism having a main line of conveying cables and a side track of conveying cables, the combination therewith of intermediate supports for the cables, consisting of uprights provided with stationary shafts, peripherally grooved wheels loosely rotatable upon said shafts, a roller track communicating with both the main line and the side track; said roller track consisting of a central curved section, a straight section at either end thereof and pivoted thereto, parallel side bars for the roller track, spreaders connecting the side bars, a plurality of axles having journals at either end rotatable in said side bars, rollers rigidly fastened upon said axles, hook shaped ends upon the outer side bars for engaging with and resting upon the stationary axles; and adjustable intermediate supports or props for the roller track, attached to the side bars.

In testimony whereof, I have hereunto set my hand and seal at the city of Los Angeles aforesaid, in the presence of two subscribing witnesses.

JOSEPH SIMONS. [L. S.]

Witnesses:
St. John Day,
Ida M. Daskam.